United States Patent [19]

Bütefisch

[11] Patent Number: 5,007,731
[45] Date of Patent: Apr. 16, 1991

[54] DOPPLER FLUID FLOW VELOCITY MEASURING APPARATUS AND METHOD UTILIZING IMAGING OF SCATTERED LIGHT

[75] Inventor: Karl-Aloys Bütefisch, Bovenden, Fed. Rep. of Germany

[73] Assignee: Deutsche Forschungsanstalt fur Luft-und Ramfahrt, Bonn, Fed. Rep. of Germany

[21] Appl. No.: 347,181

[22] Filed: May 3, 1989

[30] Foreign Application Priority Data

May 6, 1988 [DE] Fed. Rep. of Germany ....... 3815474

[51] Int. Cl.$^5$ .................................................. G01P 3/36
[52] U.S. Cl. .................................... 356/28.5; 356/345
[58] Field of Search ................... 356/5, 28, 28.5, 345

[56] References Cited

U.S. PATENT DOCUMENTS

| 4,397,550 | 8/1983 | Matsuda et al. | 356/28.5 |
| 4,715,683 | 12/1987 | Gregory et al. | 350/331 |
| 4,925,296 | 5/1990 | Reichmuth | 356/28 |

FOREIGN PATENT DOCUMENTS 3009384 12/1980 Fed. Rep. of Germany .

OTHER PUBLICATIONS

M. Young, "Low-Cost LCD Video Display for Optical Processing," *Applied Optics*, vol. 25, No. 7, Apr. 1, 1986, pp. 1024–1026.

Reattime Velocity Measurement with Laser-Doppler–Anemometric, vols. 436–437, 4 pages.

*Primary Examiner*—Linda J. Wallace
*Attorney, Agent, or Firm*—Thomas, Kerr & Kayden

[57] ABSTRACT

In the method, a volume (5) to be measured is illuminated by a pair of light beams (3) which cross each other. The Doppler-shifted scattered light (8) originating from the particles (6) which are moved along with the flow is registered and converted into electric signals (1). The Doppler frequency of the registered scattered light (8) is used as a measure of the flow velocity. The electric signals (1) of the registered scattered light (8) are digitized and represented in the form of an image and a coherent light beam is transmitted through the image. The coherent light beam (14) is focussed in a Fourier plane (18) as a result of which a Fourier-transformed image (22) of the electric signals (1), which exhibits a dot pattern (24), is generated. The Fourier-transformed image (20) is recorded and processed further. The device for carrying out the method exhibits a light source (2), a first optical system (4) which focusses the light beam (3) in the volume (5) to be measured and picks up the scattered light (8), a converter unit (9) which converts the registered scattered light (8) into electric signals (1), and an evaluating unit which further processes the electric signals (1) and represents them as velocities. The evaluating unit is associated with a controllable light modulator (13) through which the coherent light beam (14) is transmitted for displaying the electric signals (1) of the registered scattered light (8). A second optical system (17) is provided which focusses the coherent light beam (14) in the Fourier plane (18). An optical sensor (19) imaging the Fourier-transformed image (20) is provided in the Fourier plane (18). An evaluating processor (22) is arranged which records and further processes the output signals (21) of the optical sensor (19).

11 Claims, 3 Drawing Sheets

DOPPLER FLUID FLOW VELOCITY MEASURING APPARATUS AND METHOD UTILIZING IMAGING OF SCATTERED LIGHT

BACKGROUND OF THE INVENTION

The invention is based on a method for measuring the flow velocity, particularly in a wind tunnel, in which a pair of light beams which cross each other illuminates a volume to be measured and a Doppler-shifted scattered light scattered at particles moved along with the flow is registered and converted into electric signals and in which the Doppler frequency of the registered scattered light is used as a measure of the flow velocity.

Such a known method is called laser Doppler anemometry. The laser Doppler anemometry provides the capability of measuring velocities without contact and thus free of interference. Both the flow velocity of the air, for example in a wind tunnel, and the velocity of solid bodies can be measured by means of this method. The physical basis used for this is the Doppler effect. The Doppler effect is known so that it only needs to be discussed here in a fundamental way. It describes the physical phenomenon that the frequency of a moving source emitting waves is perceived with a frequency shift by an observer who is standing still. Since the velocity of the source is proportional to the frequency shift, the velocity of the source can be determined from the frequency shift. This Doppler effect represents the physical basis for the laser Doppler anemometry.

In the method known in the prior art, a volume to be measured is illuminated by a pair of light beams which cross each other, in most cases as light of a laser. The light beam is scattered at particles which are either located in the flow in any case or have been added to the flow. The scattered light, which is Doppler-shifted compared with the light beam, is registered and converted into an electric signal. This electric signal typically consists of several wave trains. To determine the flow velocity, the electric signal, which is called a burst in the technical language, must be evaluated with respect to its frequency. A fast evaluation is desirable in this context in order to keep the measuring time as short as possible. The method should also be usable with relatively high degrees of turbulence of the flow or in measurements close to the wall, that is to say when interfering scattered light (noise) occurs. To achieve this, it is known to split the electric signal of the registered scattered light into sine and cosine terms of the fundamental frequency and its harmonics with the aid of a fast Fourier transformation. The dominant frequency of the electric signal of the registered scattered light is then obtained from the component having the highest intensity. This fast Fourier transformation is carried out in a processor. The computing time needed for this is of the order of one second. Since reliable information on the flow velocity can only be obtained by averaging over several bursts, relatively long measuring times are produced which make the method unattractive. To shorten these measuring times, it is also known to carry out the fast Fourier transformation with processors specially developed for this purpose. The increase in computing speed is also achieved by the fact, among other things, that from the entire burst only a limited number of interpolation points, usually 64, from the electric signal of the registered scattered light, represented against time, is used. This is disadvantageous insofar as, as a result, reliable results can no longer be achieved if the quality of the signals is poor, that is to say with high noise. A corresponding increase in the number of interpolation points would again entail an extension of the computing time. It is also disadvantageous that such processors are relatively expensive.

It is also known to measure the zero transitions of the electric signals of the registered scattered light. So-called counters are used for this. These counters can be used for evaluating several 100,000 measurements/second which corresponds to a very fast evaluation. The disadvantageous factor in using counters is that an unambiguous counting must be possible, that is to say that the electric signal must not be noisy. Measurements close to the wall or with a high degree of turbulence cannot be evaluated with these counters. In particular, a high degree of turbulence of the flow cannot be distinguished from noise-related fluctuations in the signals.

SUMMARY OF THE INVENTION

The invention is based on the object of developing a method for measuring the flow velocity of the type initially described in such a manner that measurements can also be carried out reliably and with as little time expenditure as possible with a poor signal/noise ratio.

According to the invention, this is achieved by the fact that the electric signals of the registered scattered light are represented in the form of an image, a coherent light beam is transmitted through the image, the coherent light beam is focused in a Fourier plane and thus a Fourier-transformed image of the electric signals exhibiting a dot pattern is generated and the Fourier-transformed image is recorded and processed further. In contrast to the known method, therefore, the bursts are no longer evaluated in a computer or processor but the evaluation is optical. For this purpose, the electric signals of the registered scattered light are represented in the form of an image. A coherent light beam is transmitted through this image. The coherent light beam is focused in the Fourier planes so that the Fourier-transformed image of the electric signal of the registered scattered light is obtained in this plane. As has already been mentioned above, the image of the electric signals of the registered scattered light typically exhibits several wave trains. The Fourier-transformed image is then a dot pattern in one line or two lines which intersect at a very acute angle. Further dots are arranged at equidistant intervals along the line around a center dot. The distance of these dots from the center dot and the distance between the dots is proportional to the flow velocity so that this distance can be utilized for calculating the flow velocity. The totality of the dots contained in the Fourier-transformed image can also be utilized for further analysis as a result of which an increase in accuracy can be achieved. The optical evaluation has the advantage that the number of interpolation points available for the evaluation is considerably increased. In this connection, the number of interpolation points is only dependent on the resolution of the image of the electric signal of the registered scattered light. In the optical evaluation, the number of interpolation points is of the order of 30,000 interpolation points in comparison with 64 interpolation points in the evaluation using the processor known in the prior art. Increasing the number of interpolation points ensures that even electric signals with a high noise component, that is to say with a poor signal/noise ratio, can be reliably and quickly evaluated. This results in the capability of carrying out measurements in areas or under conditions which can no longer be reliably evaluated by means of the method known in the prior. There is a very great demand for such measurements, particularly in expensive wind tunnels, for example in boundary layers, at walls, aircraft parts or the like, since it is especially the conditions at these locations which are frequently of importance. It was not possible to carry out these measurements satisfactorily by means of the conventional measuring methods since partly the incident flow is disturbed by, for example, probes or, in laser Doppler anemometry, the signal/noise ratio was too poor. Such measurements have been reliably made possible only by the method according to the invention. It is also advantageous that the evaluation of the electric signals of the registered scattered light occurs very rapidly, namely at the velocity of light, in spite of the high number of interpolation points. This makes it possible to considerably reduce the measuring time, the number of measurements remaining the same. Thus, the novel method simultaneously satisfies two actually contradictory demands, namely, on the one hand, the measurement even with a poor signal/noise ratio and thus an increase in the number of interpolation points and, on the other hand, the shortening of the time required per measurement. In addition, operational reliability is considerably increased. This is explained by the fact that the evaluation can be followed and checked by eye, quasi at the same time. No complicated electric components are required. Any error which may occur is immediately visible and can be eliminated without time delay.

The electric signals can be wide-band filtered and/or converted into binary signals and the wide-band filtered and/or binary signals can be represented as an image. Filtering the electric signals in such a manner that only a particular frequency range, for example from 0.1 MHz-40 MHz is passed, results in a suppression of noise and an improvement in the signal/noise ratio. A certain amount of external light and other interfering influences are thus avoided from the start. The processing on the basis of optical evaluation allows a filtering over a very wide band, in contrast to the previously known methods. This prevents a falsification of the measurement result if high velocity fluctuations are to be measured. The electric signals are represented in the form of binary signals so that they can be simply and quickly represented as an image.

The electric signals and/or the binary signals can be temporarily stored. This temporary storage of the signals before the actual evaluation makes it possible that a later evaluation can still be subsequently performed. This may be necessary if, for example, errors are found in the evaluating unit which cannot be immediately eliminated. A more detailed analysis or a comparison with other measurements may also be desirable. In these cases, the original signal can then always be used.

The resolution of the image in accordance with the Doppler frequency occurring in each case can be increased and matched to the velocity to be measured by representation in a plane which forms an angle of greater than or less than 90° with the optical axis of the coherent light beam. Changing the angle between the plane in which the image is represented and the coherent light beam changes the distance between the individual periods of the electric signal of the registered scattered light in the image. This change occurs sinusoidally with the angle of rotation. When the distance in the image is reduced, the distance between the individual dots of the Fourier-transformed image is increased so that, overall, an adaptation to the Doppler frequency occurring in each case is achieved.

The device for carrying out the method is characterized by the fact that the evaluating unit exhibits a controllable light modulator, through which the coherent light beam is transmitted, for representing the electric signals of the registered scattered light, a second optical system focusing the coherent light beam in the Fourier plane is provided, an optical sensor arranged in the Fourier plane and receiving the Fourier-transformed image is provided and an evaluating processor is arranged which records the output signals of the optical sensor and processes them further. The electric signal of the registered scattered light is represented on the light modulator. An LCD screen and an LCD controller connected in series with the LCD screen can be provided as light modulator. This offers the advantage that the electric signal of the reflected scattered light is represented directly in real time, that is to say without time delay, on the light modulator. This light modulator furthermore offers the advantage that its image is relatively sharp, that is to say has a high contrast. The light modulator constructed as an LCD screen furthermore satisfies the requirement that a possibility for light transmission must be given. The LCD controller is used for appropriately controlling the LCD screen. In addition to this preferred use of the LCD controller, it is naturally also possible to use any other light modulator. It would thus be conceivable to use a correspondingly constructed reflector or a transparency as light modulator. If a transparency is used, the electric signals of the registered scattered light would be imaged on a nontransparent screen and photographed with a normal photographic apparatus. The transparency then developed from this can also be used as light modulator. The disadvantage here is, however, that the evaluation can only occur relatively late, that is to say only after the transparency has been developed. As a result, any errors which may occur cannot be immediately located. In addition, a relatively great expenditure for producing the transparencies is required. The evaluating time would also be increased to such an extent that finally an LCD screen is still used.

The coherent light beam is focused by a second optical system so that the focal point of the coherent light beam comes to lie in the Fourier plane. This light beam is transmitted through the light modulator so that the Fourier-transformed image is then represented in the Fourier plane. This Fourier-transformed image is picked up by an optical sensor. For example, a strip camera, which sends its output signals directly to an evaluating processor, is suitable as optical sensor. Due to the optical Fourier transformation and the representation of the electric signals on an LCD screen, it is always ensured that the line of dots or the bisector of the two lines of dots intersecting at a very acute angle assume the same direction so that the strip camera is always optimally aligned. The lines of dots intersecting at a very acute angle can be focused with the aid of an additional cylinder lens to form a single line of dots. Although this is associated with a systematic error, this error can be neglected because of the very acute angle. The evaluating receiver already receives the distance between the individual dots of the Fourier-transformed image as an input variable so that the evaluating processor only has to perform relatively simple computing steps which are run very rapidly. This could be, for example, a 1-d Fourier transformation. The resultant advantage is that this task can already be performed by a simple and thus inexpensive processor. The evaluating unit can exhibit a filter and/or a digitizing unit. The result is that only signals of a particular frequency, namely of the Doppler frequency to be expected, are passed and thus other interfering influences are eliminated. Digitization of the electric signals of the registered scattered light is used for displaying them on the LCD screen.

A storage device for recording the electric signals of the scattered light can be advantageously provided. This can be used for temporarily storing the electric signals and using them for a later repeated evaluation.

At the light modulator, an angle adjusting device can be provided, in which the angle adjusting device can exhibit an angle measuring device which is directly connected to the evaluating processor. This provides the capability of rotating the light modulator around its vertical axis in such a manner that its angle with respect to the optical axis of the coherent light beam is greater than or less than 90°. This makes it possible to influence the distance between the dots of the Fourier-transformed image as a result of which this distance can be adapted to the Doppler frequency occurring in each case. The angle adjusting device can exhibit an angle measuring device which is directly connected to the evaluating processor. The angle measuring device is required when absolute flow velocities are to be measured. In the case of relative measurements, the angle measuring device can be omitted as long as the light modulator or the angle of the light modulator with respect to the optical axis of the coherent light beam is not changed. In this connection, the strip camera does not also need to be adjusted.

A laser can be arranged as light source and the laser can be associated with a beam divider and a deflection mirror for splitting it into the light beam and the coherent light beam. As is usual in LDA devices, the light beam is split into a pair of light beams which cross each other by means of the optical system. Using a laser as light source offers the advantage that high-energy and -coherence, light is available. Due to the high energy of the light source or the light beam, sufficient scattered light is produced by the particles which considerably simplifies the further evaluation. The arrangement of beam divider and deflection mirror can be used for splitting the light beam of the laser into the two light beams so that, finally, not two but only one laser is required.

BRIEF DESCRIPTION OF THE DRAWINGS

The invention is described in greater detail with reference to preferred illustrative embodiments, in which.

DETAILED DESCRIPTION

Figure 1:
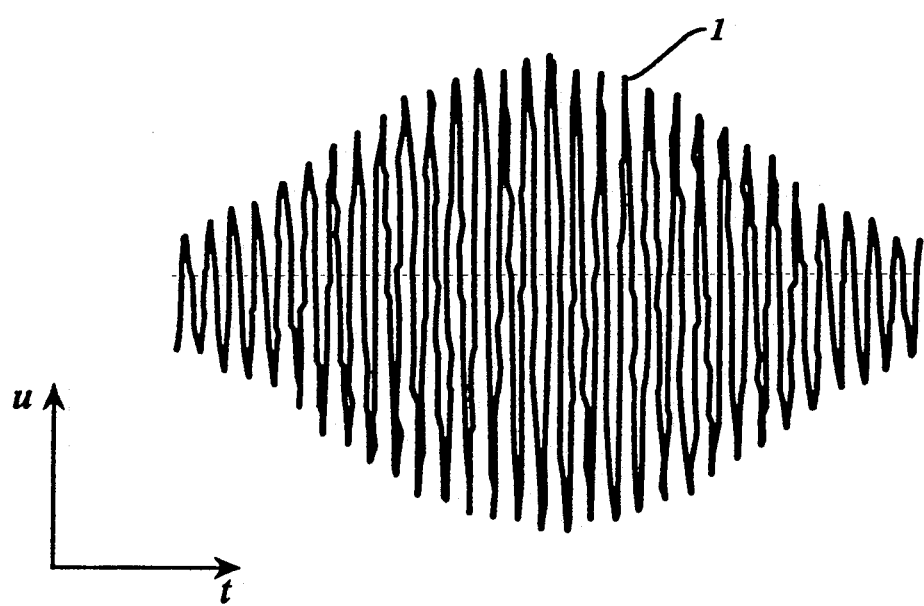
FIG. 1 shows a measured electric signal of the registered scattered light.

FIG. 1 shows a measured electric signal 1 which is plotted in a voltage U versus time t diagram. The electric signal 1 is obtained with measurements under very good conditions. The electric signal 1 shown here is free of interfering noise or the like. This electric signal 1 must now be evaluated with respect to its frequency in order to determine from this the flow velocity.

Figure 2:
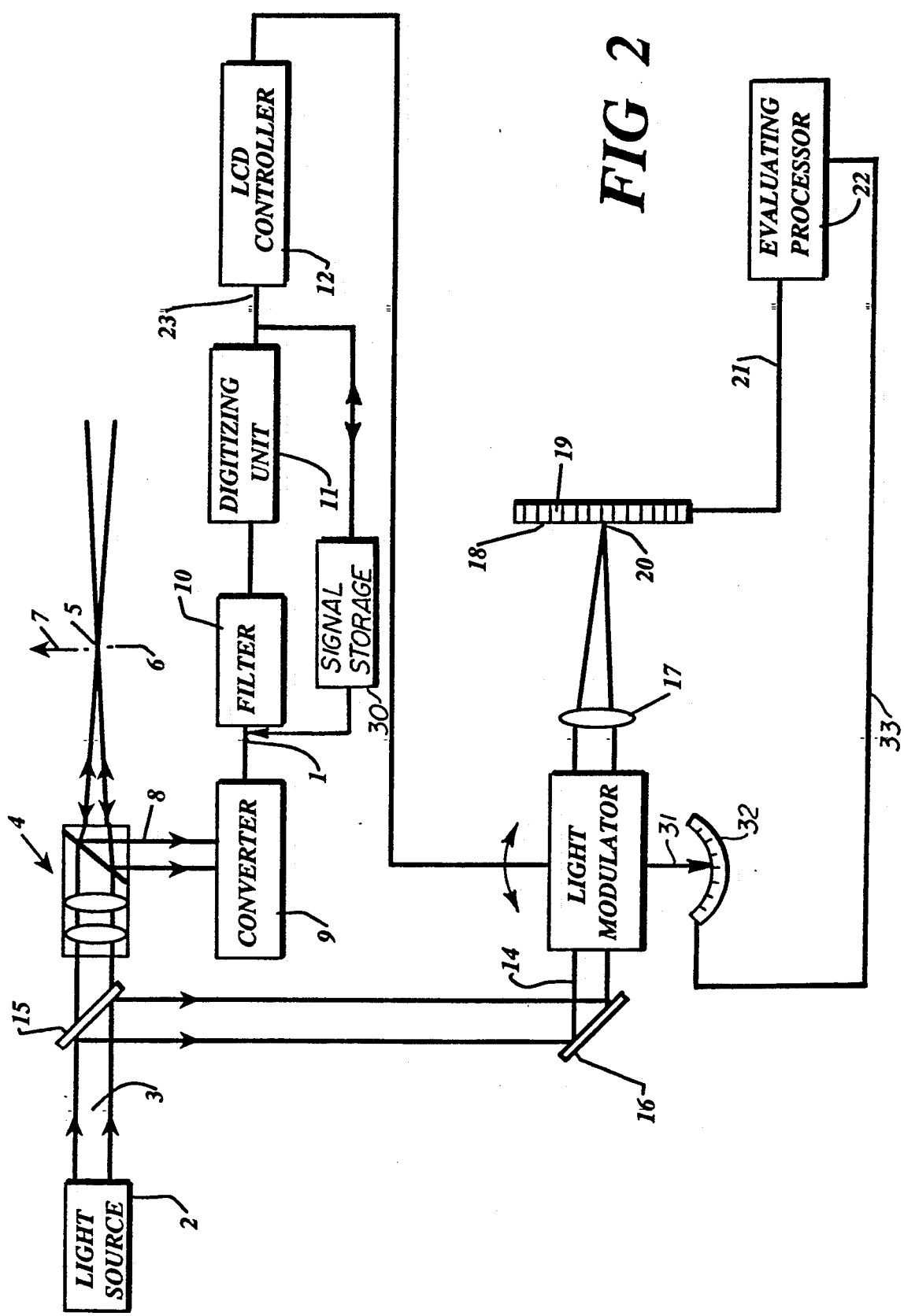
FIG. 2 shows a diagrammatic configuration for carrying out the method according to the invention.

FIG. 2 diagrammatically shows the configuration for determining the frequency of the electric signal 1 by optical means. A light source 2 generates a light beam 3 which is split into a pair of light beams which cross each other by a first optical system 4, an LDA optical system in this case, and is focused in a volume 5 to be measured. Particles 6 located in the flow move through the volume 5 to be measured in the direction of an arrow 7. A scattered light 8 originating from the particles 6 is picked up by the first optical system 4 and supplied to a converter unit 9. The scattered light 8 is converted into the electric signal 1 according to FIG. 1 in the converter unit 9. The converter unit 9 is followed by a filter 10. The filter 10 is connected to a digitizing unit 11 and the latter is connected to an LCD controller 12.

After it has passed through the filter 10, the digitizing unit 11 and the LCD controller 12, the electric signal 1 is imaged on a light modulator 13. In the illustrative embodiment shown here, an LCD screen is provided as light modulator 13. However, any other light modulator 13 could also be correspondingly used. A coherent light beam 14 is completely transmitted through the light modulator 13. This coherent light beam 14 is generated with the aid of a beam divider 15 and of a deflection mirror 16 which are inserted into the beam paths of the light beam 3. The coherent light beam 14 is focused in a Fourier plane 18 by a second optical system 17. An optical sensor 19, on which the electric signal imaged on the LCD screen is imaged as Fourier-transformed image 20 is arranged in the Fourier plane 18. A strip camera or the like can be used, for example, as optical sensor 19. However, the use of any other optical sensor 19 is conceivable. The only factor of importance is that the optical sensor 19 emits an output signal 21 which is proportional to the distance between the points of the Fourier-transformed image 20. The output signal 21 is supplied to an evaluating processor 22 which calculates from this the flow velocity of the particles 6. The result of the evaluating processor 22 can be output in any form, for example as lists or as a graphical printout.

The operation of the method and of the device is explained in the text following. The light beam 3 emerging from the light source 2 is split into the pair of light beams which cross each other by the first LDA optical system 4, and is focused in the volume 5 to be measured. In the volume 5 to be measured, the flow velocity of the flow moving in the direction of the arrow 7 is to be determined. Particles 6 are located in the flow. These particles 6 are either the dust particles or the like which are found in any flow, or particles 6 which are added to the flow. The light beam 3 is scattered at the particles 6. Due to the inherent velocity of the particles 6, the frequency of the scattered light, that is to say of the scattered light 8, is frequency-shifted compared with the frequency of the light beam 3, that is to say the generally known Doppler effect occurs. The scattered light 8 supplied by the particles 6 is picked up by the first optical system 4 and supplied to a converter unit 9. The converter unit 9 converts the scattered light 8 into the electrical signal 1. The converter unit 9 can also exhibit a so-called burst detector which suppresses the evaluation of unusable signals right from the start. The electric signal 1 of the scattered light, generated by the converter unit 9, is supplied to a signal storage member 30 for temporary storage, and to the filter 10. The filter 10 only allows signals located within a particular range to pass so that the filter 10 already performs a certain noise suppression function. The range of the filter 10, that is to say the frequency range, must be correspondingly matched to the respective flow conditions. In the case of wind tunnel flow investigations, the range of the frequencies passed by the filter 10 is between 0.1 MHz and 40 MHz. The electric signal 1 which has passed the filter 10 is supplied to the digitizing unit 11. In the digitizing unit 11, the electric signal 1 is either only digitized or converted into standardized digital signals. The standardized digital signals or binary signals 23 represent in the voltage U versus time t diagram a sequence of bars the height of which is given by the voltage U and the width of which is given by the time resolution of the digitizing unit 11. The amplitude of the binary signals 23 and their extent in the direction of the time axis t can be variable. The binary signals 23 are processed in the LCD controller 12, which is supplied with the binary signals 23, in such a manner that they are appropriately displayed on the light modulator 13. If desired, the binary signals may be stored in storage member 30. Digitization of the signals in the digitizing unit 11 is useful, in particular, if an LCD screen is used as light modulator 13. In principle, however, it is also possible to display the electric signals 1 directly on the light modulator 13, that is to say without previous digitization with the aid of the digitizing unit 11. The coherent light beam 14 is transmitted through the light modulator 13 and thus the electric signal 1 or the binary signal 23 of the scattered light 8. The coherent light beam 14 can be obtained from a separate light source or, as here in this illustrative embodiment of the light source 2 by using the beam divider 15 and the deflection mirror 16. The coherent light beam 14 is focused in the Fourier plane 18 by the second optical system 17. Thus, the Fourier-transformed image 20 of the electric signals 1 or binary signals 23 of the scattered light 8 is produced in the Fourier plane 18. The Fourier-transformed image 20 shows a dot pattern which is arranged in one line or two dot lines which intersect at a very acute angle. In this arrangement, the other dots are in each case symmetrically arranged around a center dot. The distance between the center dot and one of the two outer dots is proportional to the velocity. The Fourier-transformed image 20 is picked up by the optical sensor 19 and supplied as output signal 21 to the evaluating processor 22. This evaluating processor 22 finally calculates the flow velocity from the distance between the dots of the Fourier-transformed image 20. This calculation is performed within a fraction of a second. The distance between the dots can be influenced and adapted to the Doppler frequency in each case by making light modulator 13 rotatable about its vertical axis, by means of a suitable rotating device as indicated by the arrows in FIG. 2. An angle measuring device, shown schematically in FIG. 2 as a pointer 31 and scale 32, is connected to evaluating processor 22 by lead 33.

Figure 3:
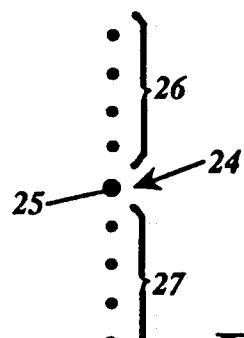
FIG. 3 shows a diagrammatic representation of a Fourier-transformed image.

FIG. 3 shows a dot pattern 24 produced as Fourier-transformed image 20 of the electric signal 1. The adjacent dots 26 and 27 are symmetrically arranged around a center dot 25. Dot 25 exhibits the highest intensity of brightness. The brightness intensity of the dots 26 and 27 decreases with increasing distance from the dot 25.

Figure 4:
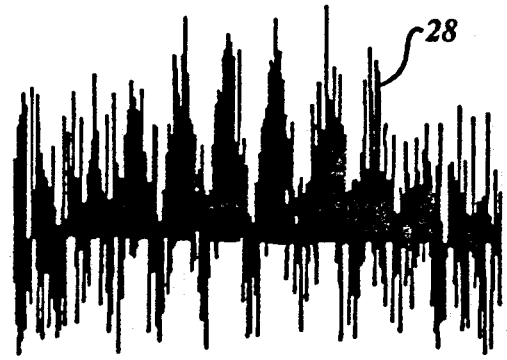
FIG. 4 shows a simulated noisy electric signal of the scattered light.
Figure 5:
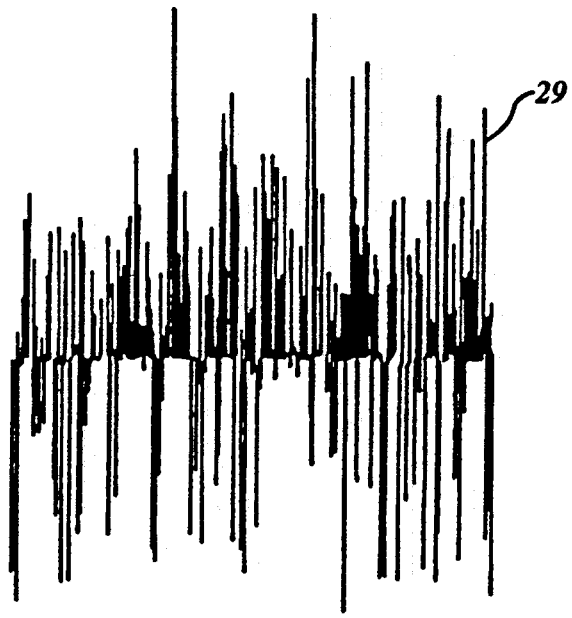
FIG. 5 shows a simulated very noisy electric signal of the scattered light.

FIGS. 4 and 5 show electric signals 28 and 29 which are highly noisy. Such electric signals 28, 29 occur in measurements under difficult conditions. Such conditions are, for example, the measurements in the vicinity of walls or in flows having very high velocities. In the electric signal 28 according to FIG. 4, a certain periodicity could still be assumed but in the electric signal 29 according to FIG. 5, in contrast, only a random "noise" seems to be present. Both the electric signal 28 and the electric signal 29 could no longer be evaluated by means of the counters known in the prior art. With respect to the electric signal 29, it appears to be at least questionable whether an evaluation would still be reliably possible with the array processors known in the prior art. In contrast, the evaluation of the electric signals 28 and 29 does not present any difficulties whatever with the method according to the invention. This is attributable to the significantly increased number of interpolation points, that is to say to the number of dots of the electric signals 28 and 29 to be evaluated. The number of interpolation points is obtained from the quality factor of the light modulator 13, that is to say from the number of dots which can be represented on the light modulator 13. In comparison with the processor known in the prior art, an increase in the number of interpolation points by a factor of about $10^3$ is easily possible. A further improvement of the light modulator 13 would allow a further increase. It is only an evaluation using this large number of interpolation points which makes it possible to use highly noisy signals for measurements or to perform measurements in areas in which high noise occurs.

List of reference designations

1 = electric signal
2 = light source
3 = light beam
4 = first optical system
5 = volume to be measured
6 = particles
7 = arrow
8 = scattered light
9 = converter unit
10 = filter
11 = digitizing unit
12 = LCD controller
13 = light modulator
14 = coherent light beam
15 = beam divider
16 = deflection mirror
17 = second optical system
18 = Fourier plane
19 = optical sensor
20 = Fourier-transformed image
21 = output signal
22 = evaluating processor
23 = binary signal
24 = dot pattern
25 = center dot
26 = dots
27 = dots
28 = electric signal
29 = electric signal

I claim:

1. A method for measuring a flow velocity of a volume of fluid, particularly in a wind tunnel, comprising the steps of illuminating the volume of fluid with a pair of light beams which cross each other resulting in Doppler-shifted scattered light scattered by particles moved along with the flow, registering the Doppler-shifted scattered light and converting it into electric signals, representing the electric signals (1, 28, 29) of the registered scattered light (8) in the form of an image, transmitting a coherent light beam (14) through the image, focusing the coherent light beam (14) in a Fourier plane (18) to generate a Fourier-transformed image (20) of the electric signals (1, 28, 29), which Fourier-transformed image (20) exhibits a dot pattern (24), and recording and further processing the Fourier-transformed image (20) to determine the flow velocity of the volume of fluid.

2. The method as claimed in claim 1, wherein the step of representing the electric signals as an image comprises the steps of wide-band filtering the electric signals (1, 28, 29), converting the wide-band filtered electric signals into binary signals (23) and representing the filtered binary signals (23) as an image.

3. The method as claimed in claim 2, wherein the binary signals (23) are temporarily stored in a storage member (30).

4. The method as claimed in claim 1 wherein the step of representing the electric signals in the form of an image comprises representing the electric signals in a plane which forms an angle of greater than or less than 90° with the direction of propagation of the coherent light beam (14) to be transmitted through the image.

5. A device for measuring a flow velocity of a volume of fluid, particularly in a wind tunnel, comprising a light source for generating a light beam, a first optical system for focusing the light beam in the volume of fluid and for registering the resulting scatter light, a converter unit for converting the registered scattered light into electric signals and an evaluating unit for processing the electric signals and representing them as velocities, wherein the evaluating unit comprises a controllable light modulator (13), through which a coherent light beam (14) is transmitted, for representing the electric signals (1, 28, 29) of the registered scattered light (8), a second optical system (17) for focusing the coherent light beam (14) in a Fourier plane to generate a Fourier transformed image (18), an optical sensor (19) arranged in the Fourier plane for receiving a Fourier-transformed image (20) and for generating output signals corresponding to the Fourier-transformed image and an evaluating processor (22) for recording the output signals (21) of the optical sensor (19) and for converting the output signals into a measurement of velocity.

6. The device as claimed in claim 5, wherein the light modulator comprises an LCD screen and wherein an LCD controller (12) is connected in series with the LCD screen.

7. The device as claimed in claim 5, wherein the evaluating unit includes a filter (10) and a digitizing unit (11).

8. The device as claimed in claim 5 further comprising a storage device (30) for recording the electric signals (1, 28, 29) of the registered scattered light (8).

9. The device as claimed in claim 5 further comprising an angle adjusting device for adjusting the angle of the light modulator (13) relative to the coherent light beam (14) and wherein the angle adjusting device includes an angel measuring device (31, 32) which is directly connected (33) to the evaluating processor (22).

10. The device as claimed in claim 5, wherein a laser arranged as the light source (2) and further comprising a beam divider (15) and a deflection mirror (16) configured and arranged for splitting the light beam 3 into a first coherent light beam and a second coherent light beam (14).

11. A method of measuring fluid flow velocity in a wind tunnel or the like, with said method comprising the steps of:
    illuminating the fluid with a coherent light beam to produce Doppler-shifter scattered light;
    registering the Doppler-shifted scattered light and converting the registered light into electric signals;
    displaying the electric signals as an image;
    illuminating the displayed image with a coherent light beam to produce the Fourier transformation of the image;
    focusing the Fourier transformation in a Fourier plane to generate a Fourier-transformed image; and
    evaluating the Fourier transformed image to determine the fluid flow.

* * * * *